May 31, 1955  F. K. KNOHL  2,709,470
SCREW AND WASHER ASSEMBLY
Filed June 14, 1951
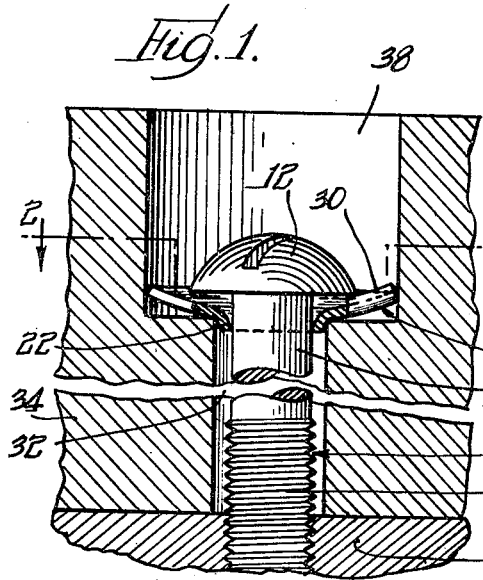
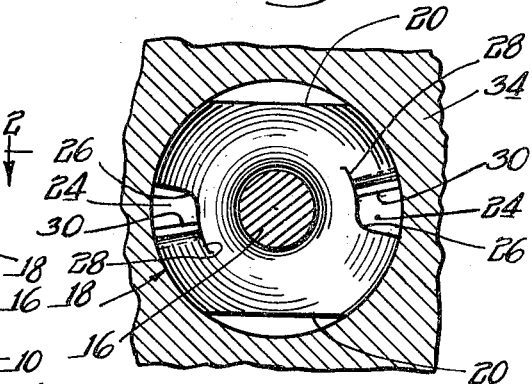
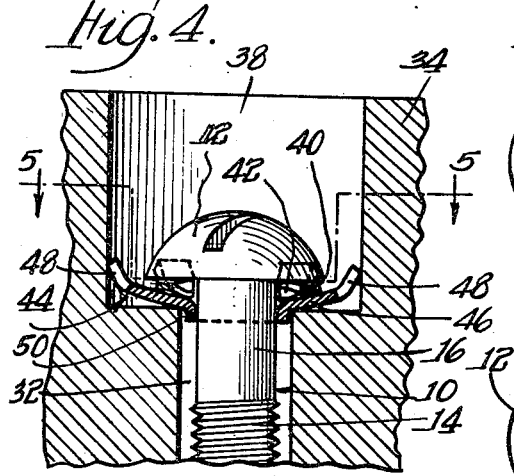
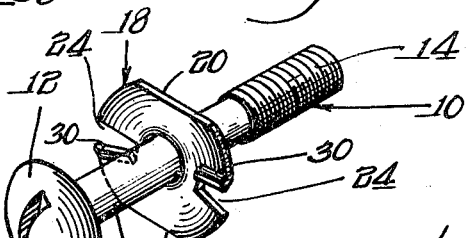
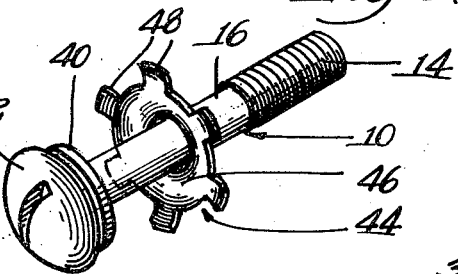
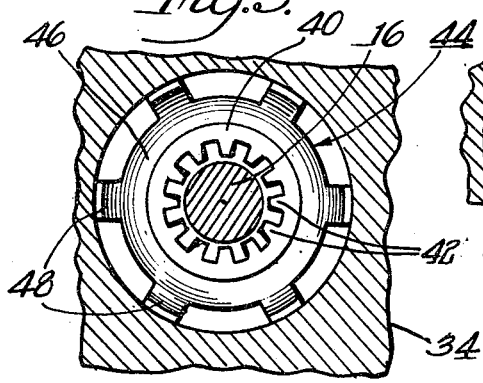
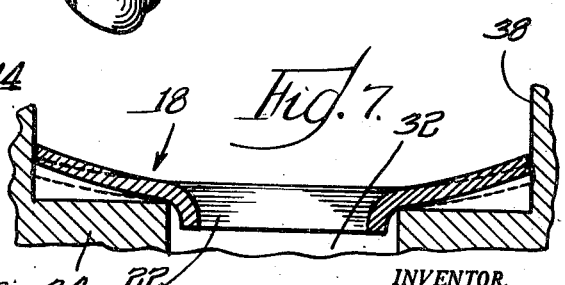
INVENTOR.
Friedrich Karl Knohl
Moore, Olson & Trexler
attys.

United States Patent Office 2,709,470
Patented May 31, 1955

2,709,470

SCREW AND WASHER ASSEMBLY

Friedrich Karl Knohl, Chicago, Ill., assignor to Illinois Tool Works, Chicago, Ill., a corporation of Illinois Application June 14, 1951, Serial No. 231,511

4 Claims. (Cl. 151—37)

This invention is concerned with a fastener device and particularly with a screw and a washer assembled therewith to hold the screw in operative position.

In many applications such as switch boxes, plugs and sockets, and other electrical appliances and devices, screws are seated at the bottoms of relatively deep recesses. When such appliances or devices are partially disassembled, as for repair, the screws and any lock washers that may be associated therewith tend to fall completely or partially from the recesses and are very difficult to handle.

An object of this invention is to provide a new or improved screw and washer assembly for trapping and anchoring the screw in a recess or counterbore.

A more specific object of this invention is to provide an assembly of a screw and spring washer insertable into a recess wherein the spring washer impinges against the side walls of the recess to trap or anchor the screw therein.

Another object of this invention is to provide an assembly of a screw and a spring washer insertable into a spring recess wherein the washer is adapted concurrently to trap or retain the screw in a recess and to lock the screw against reverse rotation.

Other and further objects and advantages of the present invention will be apparent from the following description when taken in connection with the accompanying drawings wherein:

Fig. 1 is a longitudinal view partially in section showing my screw and washer assembly in seated position at the bottom of the recess or counterbore;

Fig. 2 is a sectional view taken along the line 2—2 of Fig. 1;

Fig. 3 is a perspective view of the screw and washer;

Fig. 4 is a view similar to Fig. 1 showing a modified form of the invention;

Fig. 5 is a sectional view taken along the line 5—5 of Fig. 4 and similar to Fig. 2;

Fig. 6 is a perspective view similar to Fig. 3 and showing the modification of Fig. 4; and Fig. 7 is an enlarged cross sectional view of the washer in place showing the wedging thereof into position.

Referring first to Figs. 1–3, there is shown a relatively long screw 10 having a slotted head 12, a threaded shank portion 14 at one end, and an unthreaded shank portion 16 between the head and threaded shank portion.

A washer 18 fits on the unthreaded shank portion 16 and has a small enough diameter that it is trapped by the threads 14 which have a larger outside diameter than the unthreaded shank 16. The washer 18 is of substantially circular configuration except for the provision of flat sides 20. The washer is dished out as best may be seen in Figs. 1 and 7 and is provided with an axially extending neck 22. The washer further is provided with diametrically opposite struck out portions or recesses 24. One corner of each recess 24 is rounded as at 26 to reduce chances of fracture at that point and the other corner is slotted at 28 and the substantially radial edge of the recess adjacent the slot 28 is turned up to form a locking tongue or tooth 30 designed to bite into the under side of the screw head to lock the screw against reverse rotation.

The washer can be assembled with the screw before formation of the threads thereon and rolling of threads on the shank will increase the outside diameter to trap the washer. Alternatively, the washer can be slipped on over the threads after formation thereof, the somewhat beveled neck portion 22 facilitating such slipping on and precluding axial movement in the other direction from the screw.

The screw 10 is shown in position in a bore 32 in a work piece 34 and threadedly engaging a work piece 36 to hold at against the first work piece 34. It will be understood that the second work piece 36 can be threaded as shown or that a nut may threadedly engage the screw 10 and clamp the second work piece against the first.

The screw head 12 and the washer 18 both fit in a recess or counterbore 38 of slightly less diameter than the washer 18. The edges of the washer impinge against the side wall of the recess 38 and shift slightly upwardly relative to the central portion of the washer as the screw head forces the central section of the washer down into the recess. If the screw is retracted from the second or threaded work piece 36, upward pressure of the threads 14 against the neck 22 tends to flatten the washer out and edges of the washer dig into the side wall of the counterbore 38 slightly to trap or anchor the screw in the recess. The washer is flattened out slightly as shown in the dotted line position of Fig. 7 by pressure of the screw head 12 against the washer after the washer has reached its fully seated position and this causes the edges of the washer to bite into the sides of the recess initially to trap the screw in the recess before the screw threads 14 engage the neck 22 to flatten out the washer still more and enhance the bite on the side wall.

A modified form of the invention is shown in Figs. 4–6. In this modification, separate washers are provided for locking the screw against reverse rotation and for trapping the screw in the recess. The screw 10 may be identical with that disclosed heretofore having a slotted head 12, a threaded shank portion 14, and an unthreaded shank portion 16. A lock washer 40 of conventional construction, and herein shown as the type having internal, radially directed twisted locking teeth 42, fits on the unthreaded shank portion 16 beneath the head 12. It will be understood that other conventional types of lock washers such as split ring lock washers or externally toothed lock washers could be used rather than the internally toothed washer 40 shown.

A separate retaining or trapping washer 44 is provided on the unthreaded shank portion 16 between the lock washer 40 and threads 14. The central body portion 46 of the trapping or retaining washer is centrally dished as best may be seen in Fig. 4. Radial teeth 48 extend from the periphery of the central body portion and are spaced equally arcuately thereabout. The teeth 48 are deflected upwardly generally in the direction of concavity of the central body portion 46. A substantially axially directed neck 50 encircles the central aperture and extends oppositely relative to the teeth 48. Both of the washers 40 and 44 can be of small enough internal diameter to be trapped on the unthreaded shank by the threaded portion 14 or the lock washer 40 may have a larger internal diameter and be trapped by the retaining washer 44. It will be apparent that the washers can be assembled with the screw before threading of the screw or that they may be slipped on over the threads after the shanks have been threaded.

The work piece 34 has been illustrated as before with a bore 32 and a counterbore or recess 38. The teeth 48 flex upwardly as the washer 44 is forced down in the recess 38 by the lock washer 40 beneath the screw head 12 and spring outwardly to bite into the wall of the recess 38. Impingement of the screw threads 14 against the washer neck 50 tends to flatten out the body portion to cause the teeth 48 to bite more firmly into the side wall of the recess 38. The lock washer 40 resists retrograde rotation of the screw relative to the retaining washer 44 and rotation of this washer is precluded by the fingers 48 biting into the side wall.

It will be seen that the screw and washer assembly disclosed herein is admirably adapted for insertion in recesses or counterbores wherein the washer springs outwardly to trap or anchor the screw within the recess so that the screw and washer cannot fall out when the threads of the screw do not engage a work piece. Obviously various changes can be made in the structural details of my invention without departing from the spirit and scope thereof as expressed in the following claims, and the right therefore is expressly reserved to make such changes.

I claim:

1. A fastening device for seating in a recess of predetermined diameter; and comprising a screw element having a head portion with a clamping surface and a shank portion with a threaded portion spaced from the clamping surface and of a diameter larger than the shank portion, and a resilient metal washer having a central opening of a diameter less than the diameter of said threaded portion and trapped on the shank portion between the said threaded portion and the clamping surface, said washer having outer edge portions spaced around a circumference having a diameter greater than said predetermined diameter of the recess to effect the rearward flexing thereof in the direction of the head portion upon insertion of the fastening device into the recess and to impinge the side wall of the recess and thus retain the fastening device therein, and said washer having locking edge portions projecting toward the head portion and inclined in the direction of screwing rotation of the screw element, said locking edge portions at least partially underlying the clamping surface of the head portion to impinge thereagainst upon tightening of the fastening device for resisting relative unscrewing rotation of the screw element.

2. A fastening device as claimed in claim 1, wherein the locking edge portions are struck from the washer into position for engagement with the clamping surface of the head portion.

3. A fastening device as claimed in claim 1, wherein the locking edge portions are struck from the outer peripheral portion of the washer and extend radially inwardly to underlie the clamping surface of the head portion.

4. A fastening device as claimed in claim 3, wherein the locking edge portions flex with the outer edge portions of the washer toward engagement with the clamping surface of the head portion.

References Cited in the file of this patent

UNITED STATES PATENTS

| | | |
|---|---|---|
| 1,788,408 | Raybould | Jan. 13, 1931 |
| 1,976,198 | Steenrod | Oct. 9, 1934 |
| 2,133,871 | Reed | Oct. 18, 1938 |
| 2,176,411 | Washer | Oct. 17, 1939 |
| 2,435,079 | Hotchkin | Jan. 27, 1948 |
| 2,492,115 | Crowther | Dec. 20, 1949 |
| 2,570,003 | Palmer | Oct. 2, 1951 |